(12) United States Patent
Fu et al.

(10) Patent No.: US 12,493,942 B2
(45) Date of Patent: Dec. 9, 2025

(54) METHOD AND SYSTEM FOR GENERATING VIDEO COVER BASED ON BROWSER

(71) Applicant: SHANGHAI BILIBILI TECHNOLOGY CO., LTD., Shanghai (CN)

(72) Inventors: Qiang Fu, Shanghai (CN); Longwen Gao, Shanghai (CN); Ruoheng Liu, Shanghai (CN); Pengcheng Li, Shanghai (CN)

(73) Assignee: SHANGHAI BILIBILI TECHNOLOGY CO., LTD., Shanghai (CN)

( * ) Notice: Subject to any disclaimer, the term of this patent is extended or adjusted under 35 U.S.C. 154(b) by 449 days.

(21) Appl. No.: 17/923,228

(22) PCT Filed: Dec. 29, 2020

(86) PCT No.: PCT/CN2020/140998
§ 371 (c)(1),
(2) Date: Nov. 4, 2022

(87) PCT Pub. No.: WO2021/227531
PCT Pub. Date: Nov. 18, 2021

(65) Prior Publication Data
US 2023/0186452 A1 Jun. 15, 2023

(30) Foreign Application Priority Data
May 15, 2020 (CN) .......................... 202010413548.4

(51) Int. Cl.
G06F 16/00 (2019.01)
G06T 7/00 (2017.01)
G06V 20/40 (2022.01)

(52) U.S. Cl.
CPC ............ *G06T 7/0004* (2013.01); *G06V 20/46* (2022.01); *G06T 2207/30168* (2013.01)

(58) Field of Classification Search
CPC ................ G06F 16/739; G06F 16/972; H04N 21/23418; H04N 21/2743
See application file for complete search history.

(56) References Cited

U.S. PATENT DOCUMENTS

2004/0136460 A1 7/2004 Zhang et al.
2004/0197071 A1 10/2004 Zhang et al.
(Continued)

FOREIGN PATENT DOCUMENTS

CN 103020076 A 4/2013
CN 108600781 A 9/2018
(Continued)

OTHER PUBLICATIONS

Andreas Haas et al., "Bringing the Web Up To Speed With WebAssembly," PLDI'17, Jun. 18-23, 2017, ACM, pp. 185-200. (Year : 2017).*

(Continued)

*Primary Examiner* — Cheryl Lewis
(74) *Attorney, Agent, or Firm* — BakerHostetler

(57) ABSTRACT

This application provides techniques for generating a video cover. The techniques comprise monitoring whether the browser enters a target page; initializing a main thread and creating a frame extraction thread and an image evaluation thread; monitoring a target action on the target page extracting a plurality of target frames from the local video file using the webassembly video parser running by the frame extraction thread; determining image evaluation parameters of each of the plurality of target frame using the trained image evaluation model running by the image evaluation thread; obtaining the image evaluation parameters of each of the plurality of target frames from the image evaluation thread by the main thread, selecting one or more candidate frames from the plurality of target frames based on the image evaluation parameters of each of the plurality of target frames, and generating the video cover based on the one or more candidate frames.

19 Claims, 10 Drawing Sheets

(56) References Cited

U.S. PATENT DOCUMENTS

2011/0013882 A1* 1/2011 Kusunoki ........ H04N 21/44008
                                                    386/241
2017/0164027 A1* 6/2017 Zhang ..................... G06F 16/51
2019/0069025 A1* 2/2019 Weng ............... H04N 21/44213

FOREIGN PATENT DOCUMENTS

| CN | 108733676 A | 11/2018 |
| CN | 108833938 A | 11/2018 |
| CN | 109325145 A | 2/2019 |
| CN | 109672902 A | 4/2019 |
| CN | 110149532 A | 8/2019 |
| CN | 110347872 A | 10/2019 |
| CN | 110909205 A | 3/2020 |
| KR | 2011-0080224 A | 7/2011 |

OTHER PUBLICATIONS

In Kyu Park et al., "Design and Performance Evaluation of Image Processing Algorithms on GPUs," IEEE Transactions On Parallel And Distributed Systems, vol. 22, No. 1, Jan. 2011, pp. 91-104. (Year: 2011).*

International Patent Application No. PCT/CN2020/140998; Int'l Search Report; dated Mar. 18, 2021; 3 pages.

"What are some WebAssembly applications that stand out?"; https://www.zhihu.com/question/265700379; Dec. 2019; accessed Oct. 31, 2022; 8 pages.

* cited by examiner

METHOD AND SYSTEM FOR GENERATING VIDEO COVER BASED ON BROWSER

CROSS-REFERENCE TO RELATED APPLICATIONS

This application is the U.S. National Stage of International Application No. PCT/CN2020/140998, filed on Dec. 29, 2020, which claims priority to Chinese patent application No. 202010413548.4, entitled "A browser-based Method and System for Cover Generation" filed on May 15, 2020, the disclosures of which are incorporated herein by reference in their entireties.

TECHNICAL FIELD

Embodiments of this application relate to the field of browser technologies, and in particular, to a method and a system for generating a video cover based on a browser, a computing device, and a computer-readable storage medium.

BACKGROUND

With the development of Internet technologies, network platforms such as Youtube and Bilibilli have gradually developed a content production model in the form of UGC (User Generated Content). The core of UGC is to advocate each user to display his or her original content (such as video files) provide it to other users through the platform. UGC enables everyone to be a content producer, so that massive videos can be quickly produced to enrich people's spiritual life. However, it also causes each user-generated video file to become more inconspicuous in the massive videos. Therefore, when a user publishes a video file, a cover is routinely set for the published video file, so that other users can more intuitively know the content of the video file and the click counts is increased.

SUMMARY

The purpose of embodiments of this application is to provide a method and a system for generating a video cover based on a browser, a computing device, and a computer-readable storage medium, with the intention to solve the serious problem of time consumption and server resources consumption in generating covers for video files.

One aspect of the embodiment of this application is providing a method for generating a video cover based on a browser. The method includes: monitoring whether a browser enters a target page; initializing a main thread and creating a frame extraction thread and an image evaluation thread in response to determining that the browser enters the target page, where the frame extraction thread is configured to load a webassembly video parser, and where the image evaluation thread is configured to load a trained image evaluation model; monitoring the target action based on the target page, where the target action is associated with a local video file; and in response to the target action, performing operations including: extracting a plurality of target frames from the local video file using the webassembly video parser, where the webassembly is running by frame extraction thread; determining image evaluation parameters of each of the plurality of target frame using the trained image evaluation model, where the trained image evaluation model is running by the image evaluation thread; and obtaining the image evaluation parameters of each of the plurality of target frames from the image evaluation thread by the main thread, selecting one or more candidate frames from the plurality of target frames based on the image evaluation parameters of each of the plurality of target frames, and generating the video cover based on the one or more candidate frames.

Optionally, the extracting a plurality of target frames from the local video file using the webassembly video parser further includes: determining whether the local video file is in a portrait orientation using the WebAssembly video parser; extracting a plurality of frames from the local video file using the WebAssembly video parser; performing image rotation on each of the plurality of frames to obtain frames in the portrait orientation if the local video file is in the portrait orientation; and determining the plurality of frames in the portrait orientation as the plurality of target frames.

Optionally, the extracting a plurality of target frames from the local video file using the webassembly video parser further includes: obtaining N frames corresponding to N time nodes, including: acquiring a key frame closest to a time node M, and determining the key frame as a frame corresponding to the time node M, where $1 \leq M \leq N$.

Optionally, the extracting a plurality of target frames from the local video file using the webassembly video parser further includes: performing a detection operation on the local video file, and determining whether to extract the plurality of target frames from the local video file based on a detection result; where the detection operation is configured to detect whether the local video file is a damaged file, whether the local video file contains a video stream, and/or whether a video format of the video stream is supported by the webassembly video parser.

Optionally, the determining image evaluation parameters of each of the plurality of target frame using the trained image evaluation model further includes: extracting image features of a target frame M among the plurality of target frames by a feature extraction layer of the trained image evaluation model, where $1 \leq M \leq N$, and N represents a total number of the plurality of target frames; determining confidence levels of the target frame M based on the image features of the target frame M by a first fully connected layer of the trained image evaluation model, the confidence levels corresponding to a plurality of scene categories; determining an image quality evaluation value of the target frame M based on the image features of the target frame M by a second fully connected layer of the trained image evaluation model; and determining the image evaluation parameters of the target frame M based on the confidence levels of the target frame M and the image quality evaluation value of the target frame M.

Optionally, the determining the image evaluation parameters of the target frame M based on the confidence levels of the target frame M and the image quality evaluation value of the target frame M further includes: determining the image evaluation parameters P of the target frame M by a formula:

$$P = p2 \Sigma_i W_{i, \arg\max p1} p1_i$$

where, $p1_i$ represents a confidence level of the target frame M corresponding to a scene category i, p2 represents the image quality evaluation value of the target frame M, arg max p1 represents a target scene category with a maximum confidence level, and $W_{i, \arg\max p1}$ represents a weight of a degree of association between the target scene category corresponding to target frame M and an ith scene category.

Optionally, the generating the video cover based on the one or more candidate frames further includes: displaying the one or more candidate frames in a predetermined area of the target page; selecting a candidate frame from the one or more candidate frames based on user input; and generating the video cover based on the selected candidate frame, where the video cover is associated with the local video file, and where the video cover is sent to a server.

Another aspect of the embodiment of this application is providing a system for generating a video cover based on a browser. The system for generating a video cover based on a browser includes: a first monitoring module for initializing a main thread and creating a frame extraction thread and an image evaluation thread in response to determining that the browser enters the target page, where the frame extraction thread is configured to load a webassembly video parser, and where the image evaluation thread is configured to load a trained image evaluation model; a second monitoring module for monitoring a target action on the target page, where the target action is associated with a local video file; and a second response module for performing the following operations in response to the target action: extracting a plurality of target frames from the local video file using the webassembly video parser, where the webassembly is running by frame extraction thread; determining image evaluation parameters of each of the plurality of target frame using the trained image evaluation model, where the trained image evaluation model is running by the image evaluation thread; and obtaining the image evaluation parameters of each of the plurality of target frames from the image evaluation thread by the main thread, selecting one or more candidate frames from the plurality of target frames based on the image evaluation parameters of each of the plurality of target frames, and generating the video cover based on the one or more candidate frames.

Another aspect of the embodiment of this application is further providing a computing device, including a memory, a processor, and computer-readable instructions stored in the memory and executable by the processor, where the processor executes the computer-readable instructions to perform the following steps: monitoring whether a browser enters a target page; initializing a main thread and creating a frame extraction thread and an image evaluation thread in response to determining that the browser enters the target page, where the frame extraction thread is configured to load a webassembly video parser, and where the image evaluation thread is configured to load a trained image evaluation model; monitoring the target action on the target page, where the target action is associated with a local video file; and in response to the target action, performing operations including: extracting a plurality of target frames from the local video file using the webassembly video parser, where the webassembly is running by frame extraction thread; determining image evaluation parameters of each of the plurality of target frame using the trained image evaluation model, where the trained image evaluation model is running by the image evaluation thread; and obtaining the image evaluation parameters of each of the plurality of target frames from the image evaluation thread by the main thread, selecting one or more candidate frames from the plurality of target frames based on the image evaluation parameters of each of the plurality of target frames, and generating the video cover based on the one or more candidate frames.

Another aspect of the embodiment of this application is further providing a computer-readable storage medium, including a memory, a processor, and computer-readable instructions stored in the memory and executable on the processor, where the processor executes the computer-readable instructions to perform the following steps: monitoring whether a browser enters a target page; initializing a main thread and creating a frame extraction thread and an image evaluation thread in response to determining that the browser enters the target page, where the frame extraction thread is configured to load a webassembly video parser, and where the image evaluation thread is configured to load a trained image evaluation model; monitoring the target action on the target page, where the target action is associated with a local video file; and in response to the target action, performing operations including: extracting a plurality of target frames from the local video file using the webassembly video parser, where the webassembly is running by frame extraction thread; determining image evaluation parameters of each of the plurality of target frame using the trained image evaluation model, where the trained image evaluation model is running by the image evaluation thread; and obtaining the image evaluation parameters of each of the plurality of target frames from the image evaluation thread by the main thread, selecting one or more candidate frames from the plurality of target frames based on the image evaluation parameters of each of the plurality of target frames, and generating the video cover based on the one or more candidate frames.

The method and system for generating a video cover based on a browser, the computing device, and the computer-readable storage medium provided by the embodiment of this application have the following technical advantages: (1) by loading and running the webassembly video parser in the frame extraction thread, the browser can extract a plurality of target frames from a local video file without uploading it to the server and extracting and returning a plurality of target frames by the server. (2) The browser loads and runs the image evaluation model through the image evaluation thread, so it can perform the image evaluation operation independently without uploading the local video file to the server for evaluation and returning image evaluation parameters. To sum up, in this embodiment, a series of operations such as frame extraction and image evaluation can be independently performed by the browser, which avoids the problem of long cover generation time caused by the need to rely on the server to complete in the prior art, as well as the problem of serious situation of server resources consumption. It can be seen that the generation time of the cover in this embodiment is shorter and no server resources are consumed.

DESCRIPTION OF EMBODIMENTS

Figure 1:
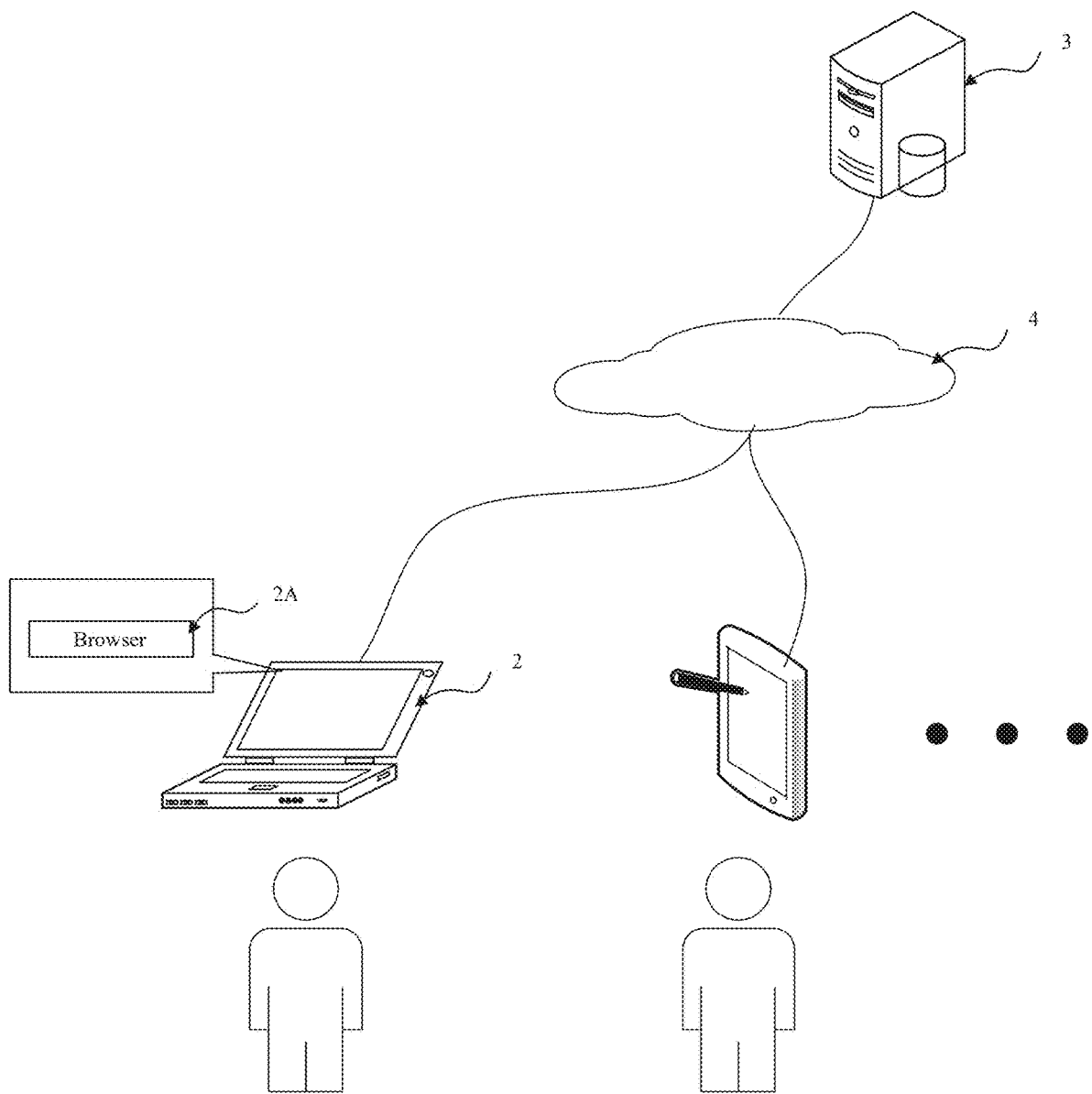
FIG. 1 schematically shows a running environment diagram of a method for generating a video cover based on a browser according to an embodiment of this application.

In order to make the objectives, technical solutions and advantages of this application more clear, this application is further described in detail below with reference to the accompanying figures and embodiments. It should be understood that the specific embodiments described herein are only used to explain this application, but not to limit this application. Based on the embodiments in this application, all other embodiments obtained by those of ordinary skill in this field without creative efforts shall fall within the protection scope of this application.

It should be noted that the descriptions involving "first", "second", etc. in the embodiments of this application are only for description purposes, and should not be understood as indicating or implying their relative importance or implicitly indicating the quantity of indicated technical features. Thus, a feature delimited with "first", "second" may expressly or implicitly include at least one of that feature. In addition, the technical solutions of the various embodiments can be combined with each other, but must be based on the realization by those of ordinary skill in the field. When the combination of technical solutions is contradictory or cannot be realized, it should be considered that the combination of such technical solutions does not exist., and is not within the scope of protection claimed in this application.

The following is explanations of some terms that may be involved in this application:

ffmpeg: Written in C language, it can run functions such as recording, parsing, conversion, and streaming of audio and video of various formats.

Libjpeg: A free library written in C language for processing JPEG image data format.

Emcc: Used to compile files to LLVM bytecodes.

javascript/js: A scripting language that runs inside a browser.

WebAssembly/wasm: A binary instruction format for a stack-based virtual machine, running in a sandboxed execution environment in the browser; it is designed as a portable target for high-level languages such as C/C++/Rust, and can be used to deploy client applications and server applications on Web environment.

asm.js: It can solve the problem of execution efficiency of js engine, especially the efficiency of programs compiling from C/C++ language to js using Emscripten. In this application, asm.js is used as a bottom-up solution for browsers that do not support WebAssembly technology.

LLVM (low level virtual machine): A compiler infrastructure, written in C++, including a series of modular compiler components and toolchains, used to develop front-end and back-end of compilers. LLVM bytecode refers to the intermediate code that has been compiled, but not specific to certain machine code, and needs to be translated by the LLVM interpreter to become machine code.

Emscripten: An asm.js & WebAssembly compilation toolchain based on LLVM. In this application, Emscripten can compile the relevant code for ffmpeg generated by C language into asm.js&WebAssembly.

Image evaluation model: It can be a deep learning framework based on Tensorflow. TensorFlow is an end-to-end open source software library for machine learning that can be used in machine learning applications such as deep neural networks, etc.

Frame extraction: Extracting one or more frames from a video file.

Frame Evaluation: Used to evaluate whether each frame is suitable as a video cover for a video file.

The problem solved by this application is described below.

The process of setting a video cover in the prior art is as follows: 1. the server receives the video file uploaded by the user through a browser; 2. extracts and evaluates each frame in the video file after receiving it; 3. some frames suitable to be the video cover are selected according to the evaluation results and fed back to the browser for the user to select one as the cover of the video file. The inventor has realized that the prior art has the following technical defects: obtaining a video cover requires a plurality of server-side processing steps such as video file reception, frame extraction and evaluation, resulting in a serious time consumption for the generation of the cover of the video file, and the inability to generate the cover of the video in time; It also causes a serious consumption of server resources.

When a user publishes a video file to an online platform through a browser, he/she routinely sets a cover for the published video file, so that other users can more intuitively know the content of the video file and the click counts is increased. In the process of setting the cover for a video file, steps such as "frame extraction" and "image evaluation" are required. The "frame extraction" is to extract a still image from the video file by using the ffmpeg technology according to the time node of the frame to be extracted in the video file. The "image evaluation" is to perform image evaluation on each frame extracted from the video file, so as to evaluate whether these frames are suitable to be the cover of the video file. Among them: in the prior art, the "frame extraction" operation is performed mainly by the following two means, first: upload the video file to the server, and after the upload is completed, run the ffmpeg command on the server to extract each frame from the video file. Second, use the embedded video tag of the Canvas on the browser to play the video file and perform screenshot as background hidden operations to the user, but this technology only supports a few video encoding formats (depending on the browser) and does not support most of the video formats on the market. And because different browsers support different video formats, the "frame extraction" operation currently needs to be performed on the server. In the prior art, the "image evaluation" operation is mainly realized through the following process: run the image evaluation model on the server in advance, perform the image evaluation operation on each frame extracted by the server, select some frames according to the evaluation results and feeding them back to the browser for the user to select one of these frames as the cover of the video file. Therefore, the process of setting the video cover in the prior art is as follows: the user uploads the video file through the browser→the video file is completely uploaded to the server→the server performs frame extraction on the video file→the server performs image evaluation on each frame→the server selects some frames according to the evaluation results and feeds back to the browser for the user to select one of these frames as the cover of the video file. The main problems existing in the prior art are: the generation of the recommended cover is very time-consuming, and it relies on the multi-step processing results of the server, such as the completion of uploading, frame extraction, and image evaluation, so that when some users submit the descriptions, the recommended cover has not been generated in time; It also causes serious consumption of server resources.

Several embodiments are provided below, and it can be seen that the various embodiments provided below are applicable to solve the technical problems described above.

FIG. 1 schematically shows a running environment diagram of a method for generating a video cover based on a browser according to Embodiment 1 of this application. In the exemplary embodiment, the computing device 2 can connect to the content distribution platform 3 through the network 4 and publish the content through the content distribution platform 3. The content may include local video files in the computing device 2 or the like.

The computing device 2 can be configured to access the content distribution platform 3 through the browser 2A and upload local video files to the content distribution platform 3 through the browser 2A to publish its video files on the content distribution platform 3. The computing device 2 may refer to any type of computing device, such as a mobile device, a tablet device, a laptop computer, and the like.

The content distribution platform 3 may include a plurality of servers and is used to provide the computing device 2 with a video file publishing service. The plurality of servers may include virtualized computing instances. Virtualized computing instances may include virtual machines, such as emulations of computer systems, operating systems, servers, and the like. A server may load a virtual machine based on a virtual image and/or other data that defines the specific software (eg, operating system, dedicated applications, server) used for emulation. Different virtual machines may be loaded and/or terminated on one or more servers as requirements for different types of processing services change. A hypervisor can be implemented to manage the usage of different virtual machines on the same server.

The network 4 may include various network devices such as routers, switches, multiplexers, hubs, modems, bridges, repeaters, firewalls, proxy devices and/or the like. The network 4 may be physical links such as coaxial cable links, twisted pair cable links, fiber optic links, combinations thereof, and/or the like. The network 4 may include wireless links such as cellular links, satellite links, Wi-Fi links and/or the like.

Embodiment 1

Figure 2:
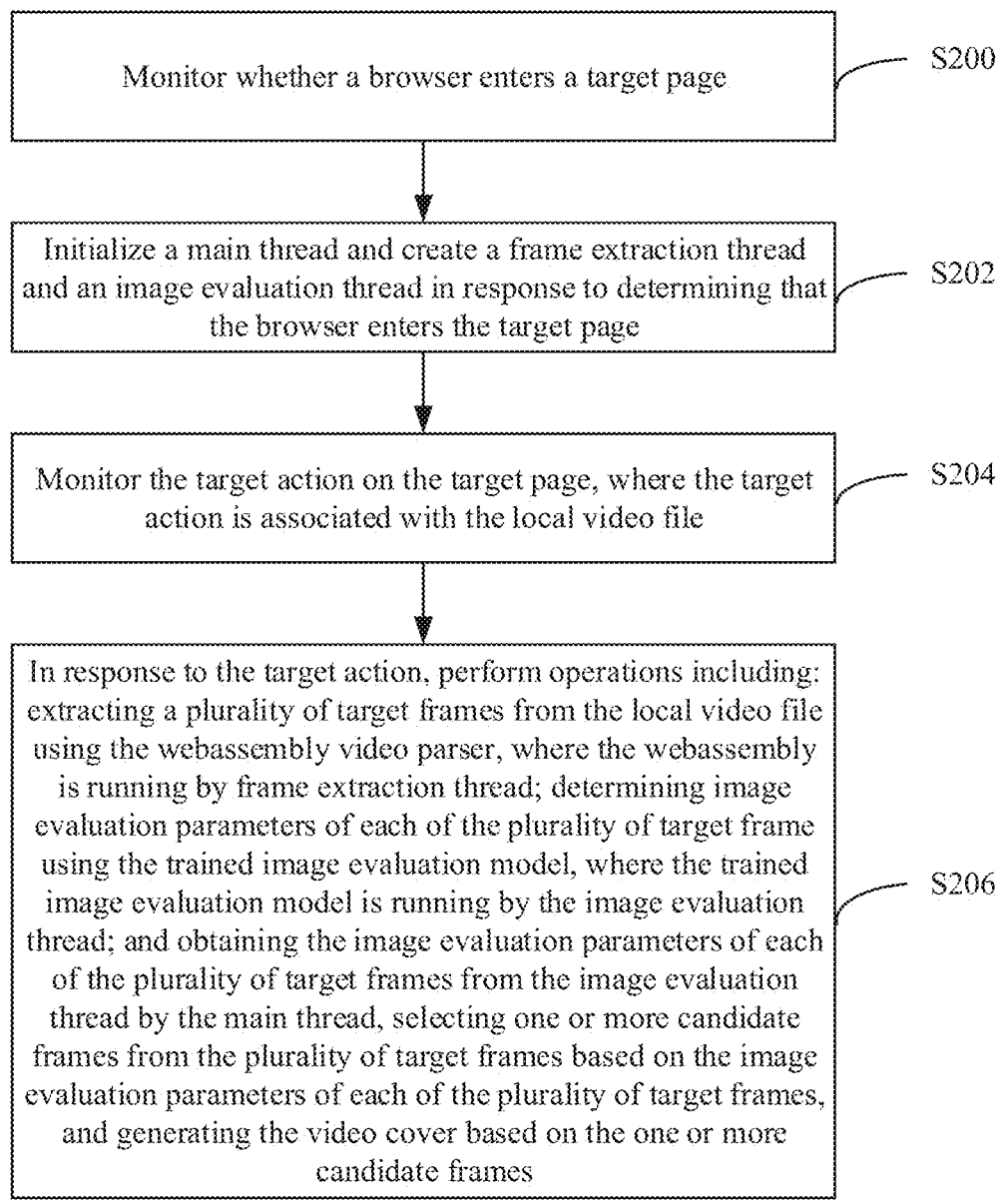
FIG. 2 schematically shows a flow chart of a method for generating a video cover based on a browser according to an embodiment of this application.

FIG. 2 schematically shows the flow chart of a method for generating a video cover based on a browser according to Embodiment 1 of this application. It can be understood that the flow chart in this embodiment of the method is not used to limit the sequence of executing steps. The following is an exemplary description with the computing device 2 as the execution subject.

As shown in FIG. 2, the method for generating a video cover based on a browser may include steps S200-S206, where:

Step S200. Monitor whether the browser 2A enters a target page.

Figure 3:
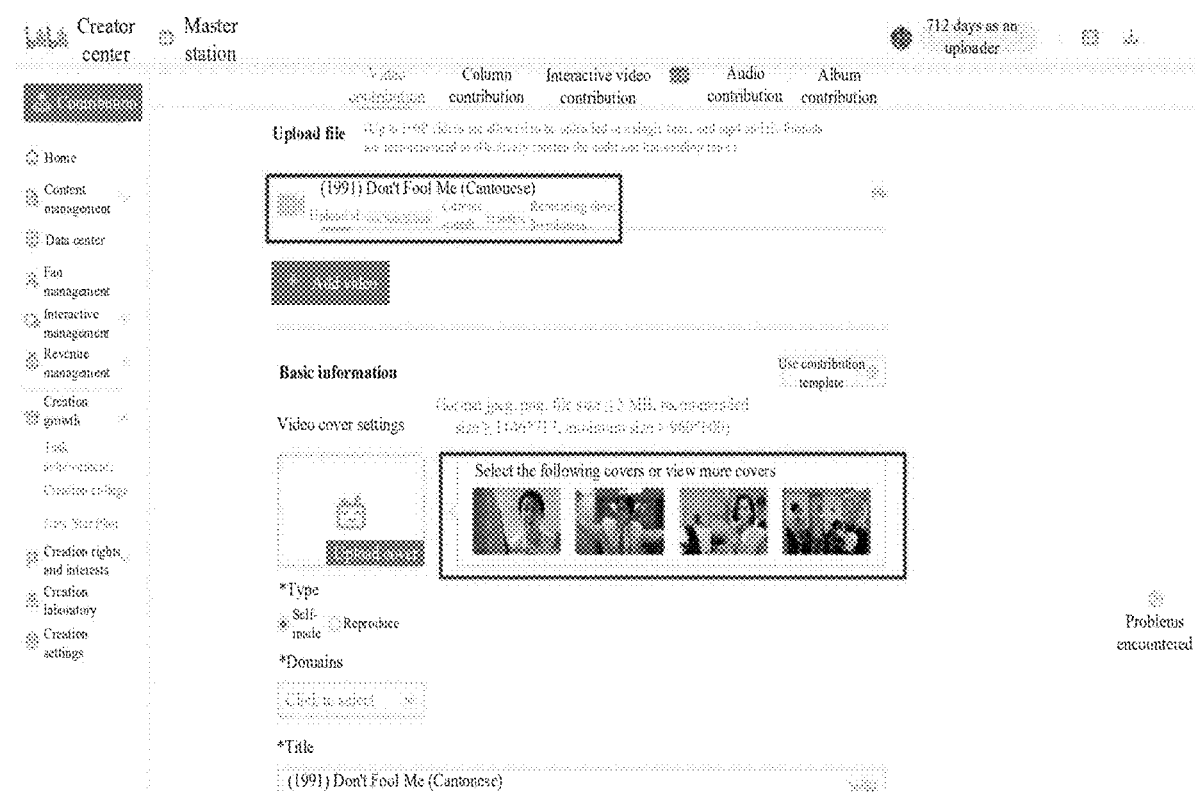
FIG. 3 schematically shows a schematic diagram of a target page.

Each tab page in the browser 2A corresponds to an independent process, and each process corresponds to one or more threads. When the browser 2A begins to load the target page, it means that the browser 2A has opened a new tab page. As shown in FIG. 3, in the exemplary embodiment, the target page may be a posting page, which is used to provide an interface entry for a user to upload a local video file to the content distribution platform 3.

Step S202. Initialize a main thread and create a frame extraction thread and an image evaluation thread in response to determining that the browser 2A enters the target page.

The target page may be associated with a plurality of threads, and one of them is the main thread, and such main thread may be used for rendering, displaying the target page and interaction etc. In this exemplary embodiment, an additional frame extraction thread and an image evaluation thread are created, so that operations such as frame extraction and image evaluation do not need to be implemented in the main thread, thereby ensuring that rendering, displaying the page and interaction operation in the main thread are not affected by operations such as frame extraction and image evaluation.

Figure 4:
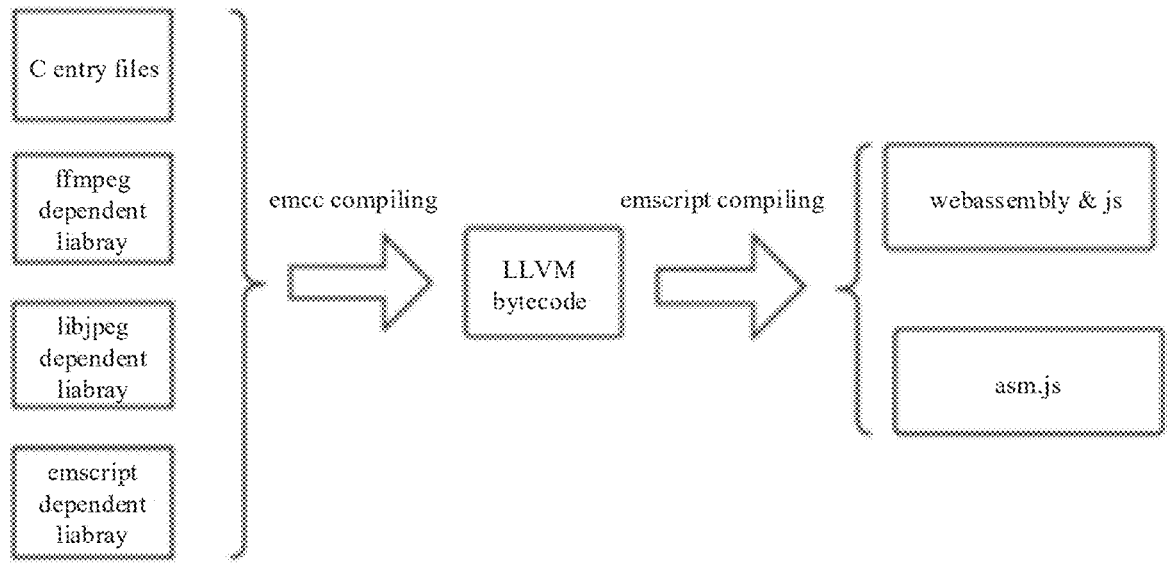
FIG. 4 schematically shows the compilation flow chart of a webassembly video parser.

The frame extraction thread is used to load the webassembly video parser. As shown in FIG. 4, the compiling process of the webassembly video parser can be as follows: (1) prepare the C entry-point, ffmpeg dependent library, libjpeg dependent library and emscipten dependent library; (2) compile the files in (1) through emcc and obtain LLVM bytecode; (3) compile the LLVM bytecodes through Emscripten to obtain webassembly and asm.js. Webassembly and asm.js enable ffmpeg work in a browser environment and provide browser-based frame extraction services. Since asm.js belongs to a downgrade solution of webassembly, in this application, webassembly and asm.js are collectively called webassembly video parser. In this embodiment, based on the webassembly technology, by compiling the C language source code of ffmpeg and implementing it independently, the browser 2A are endowed with the capabilities of ffmpeg, that is, the browser 2A can independently complete operations such as frame extraction for videos in a plurality of encoding formats.

The image evaluation thread is used to load the trained image evaluation model. The image evaluation model may be a deep neural network model and can be iteratively trained in days or weeks to improve the evaluation accuracy. The iterative training means mixing the newly added users' data and the original users' data in a proportional ratio and using such mixed data for repeated training.

Step S204. Monitor a target action on the target page, where the target action is associated with a local video file.

In the exemplary embodiment, the target action may be an upload operation. As shown in FIG. 3, if the computing device 2 monitors a click on the upload button, it means that the target action based on the target page is monitored, and the target action is to upload the local video file "(1991) Don't Fool Me (Cantonese)" to the content distribution platform 3 to publish this local video file through the content distribution platform 3.

Step S206. In response to the target action, perform operations including:

Step S206A: Extract a plurality of target frames from the local video file using the webassembly video parser, where the webassembly is running by the frame extraction thread.

Figure 5:
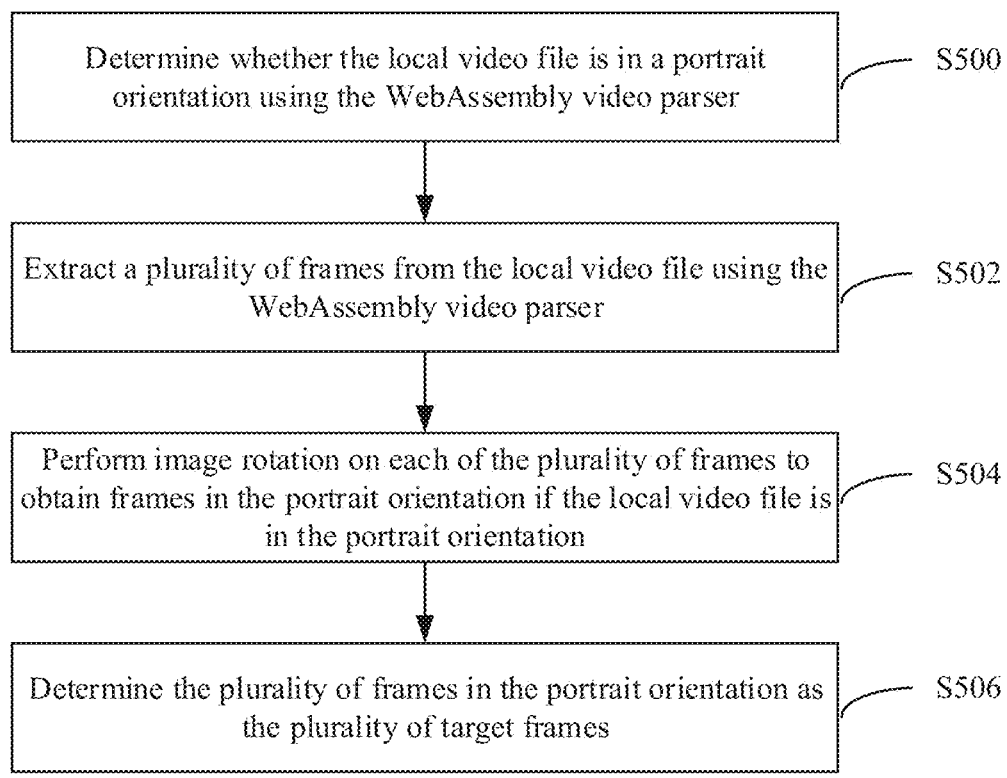
FIG. 5 schematically shows a sub-flow chart of a frame extraction operation.

In the exemplary embodiment, in order to ensure that each target frame can be displayed correctly and that each target frame can be correctly identified and evaluated in the image evaluation thread, as shown in FIG. 5, the step S206A may include step S500~S506. Step S500, the webassembly video parser determines whether the local video file is in a portrait orientation; Step S502, the webassembly video parser extracts a plurality of frames from the local video file; Step S504, if all If the local video file is in a portrait orientation, then each frame of the plurality of frames is image-flipped to obtain each frame for the video in a portrait orientation; step S506, sets each frame for the video in a portrait orientation as a corresponding target frame. It should be noted that, if the local video file is in a landscape orientation, each of the plurality of frames is directly set as a corresponding target frame without performing a flip operation. As an example, if the local video file Y was shot when the mobile phone X was in a portrait orientation, therefore, the local video file Y is a portrait-orientation file. When parsing a portrait-orientation file, the webssembly video parser will convert the it into a landscape-orientation file. The above approach may cause such a problem: the frames extracted from the portrait-orientation file are in a landscape orientation, so that these frames are displayed in different orientation from the local video file Y. Therefore, these frames cannot be displayed correctly and are unavailable to the image evaluation thread. To address such problem, the browser 2A can parse the local video file Y through the webassembly video parser, and obtains the flip information written in the local video file Y when the mobile phone X shooting the local video file Y, thus determines whether the local video file Y is a portrait-orientation file or a landscape-orientation file. If the local video file Y is a portrait-orientation file, the browser 2A performs a flip operation on the plurality of frames extracted from the local video file Y through the webassembly video parser, to align the displaying orientation of the flipped frames with the local video file Y.

Figure 6:
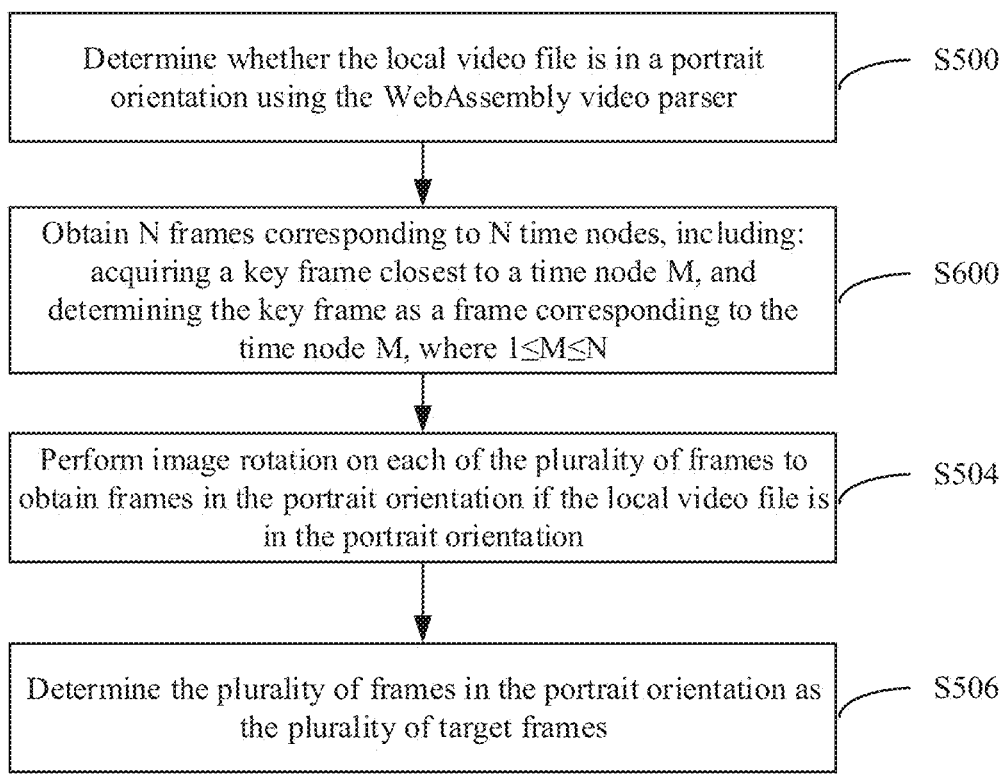
FIG. 6 schematically shows another sub-flow chart of a frame extraction operation.

In the exemplary embodiment, as shown in FIG. 6, in order to reduce the consumption of computing resources of the computing device 2 while ensuring that the plurality of frames extracted from the local video file are of high quality and the most typical, Step S502 can be implemented by the following steps: Step S600, obtaining N frames corresponding to N time nodes, including: obtaining the key frame of the nearest time node M, and setting this key frame as the frame corresponding to the time node M, where 1≤M≤N. Both M and N are positive integers. M is an independent variable. N may be a preset value, or may be a dynamic value that can be adjusted according to the current workload of the computing device 2. For example, when the computing device 2 is in a high load state, N can be dynamically adjusted to a time node every 10 seconds. When the computing device 2 is in an idle state, N can be dynamically adjusted to a time node every 5 seconds. For example, the N time nodes include: the first time node (corresponding to 0 second of the local video file on the progress bar), the second time node (corresponding to 5 second of the local video file on the progress bar), the third time node A time node (corresponding to 15 second of the local video file on the progress bar), the fourth time node (corresponding to the 20 second of the local video file on the progress bar), the fifth time node (corresponding to the 25 second of the local video file on the progress bar), . . . . The browser 2A can parse the frame information of each frame in the local video file (frame I, frame P, frame B) through the webassembly video parser, and then can perform the following operations: find the nearest frame neighboring to the first time node according to the frame information of each frame and set this frame I as the key frame of time node 1; find the nearest frame neighboring to the second time node according to the frame information of each frame and set this frame I as the key frame of time node 2; and so on. It should be noted that the frame I is also called an intra picture.

Figure 7:
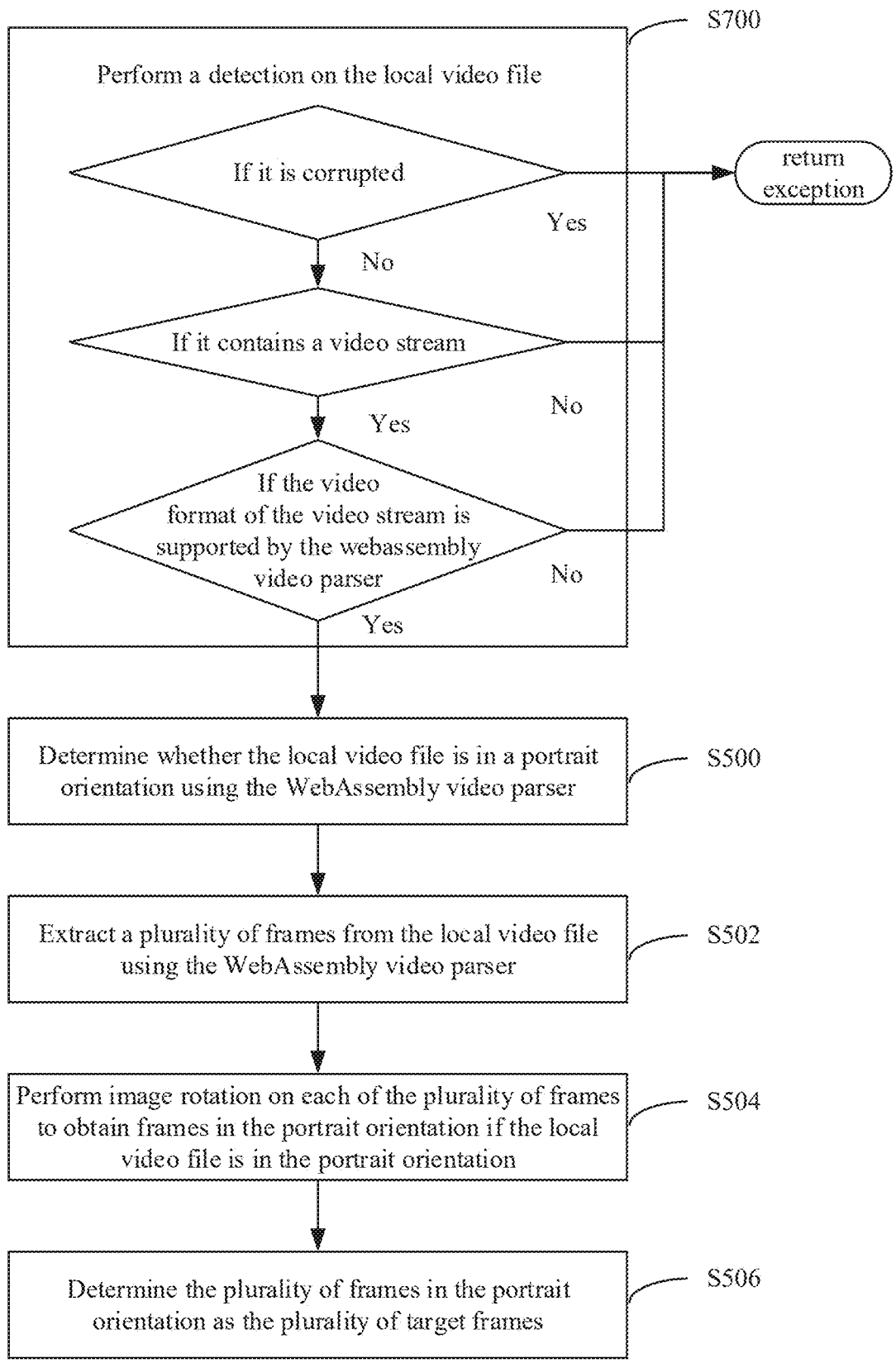
FIG. 7 schematically shows another sub-flow chart of a frame extraction operation.

In the exemplary embodiment, as shown in FIG. 7, in order to ensure the availability of the local video file, before performing the frame extraction operation, the browser 2A also needs to run the webassembly video parser to perform step S700: The detection operation is performed on the local video file to determine whether to extract the plurality of target frames from the local video file according to the detection result. The detection operation is used to detect: whether the local video file is a damaged file, whether the local video file contains a video stream, and/or whether the video format of the video stream is supported by the webassembly video parser.

Step S206B. Determine image evaluation parameters of each of the plurality of target frame using the trained image evaluation model, where the trained image evaluation model is running by the image evaluation thread.

In the exemplary embodiment, the main thread may acquire the plurality of target frames provided by the frame extraction thread, and transfer the image data of the plurality of target frames or the format-converted target frames to the image evaluation thread. The image evaluation thread runs the image evaluation model and inputs the image data of the plurality of target frames or the format-converted into the image evaluation model to output the image evaluation parameters of each target frame through the image evaluation model.

The image evaluation model may be a deep neural network model or other models.

In the exemplary embodiment, the image evaluation model includes a feature extraction layer, a first fully connected layer and a second fully connected layer, and the feature extraction layer may be composed of one or more convolutional layers for the extraction of the image features of each target frame through convolutional operations. It should be noted that the first fully connected layer and the second fully connected layer are in a parallel relationship, and the first fully connected layer and the second fully connected layer share the feature extraction layer. The first fully connected layer is used for scene recognition, and the second fully connected layer is used for image quality evaluation. Compared with separate scene recognition model and image quality evaluation model in the prior art, this embodiment realizes the scene recognition and the image quality evaluation through one image evaluation model, and effectively reduces the amount of computing by sharing the feature extraction layer.

Figure 8:
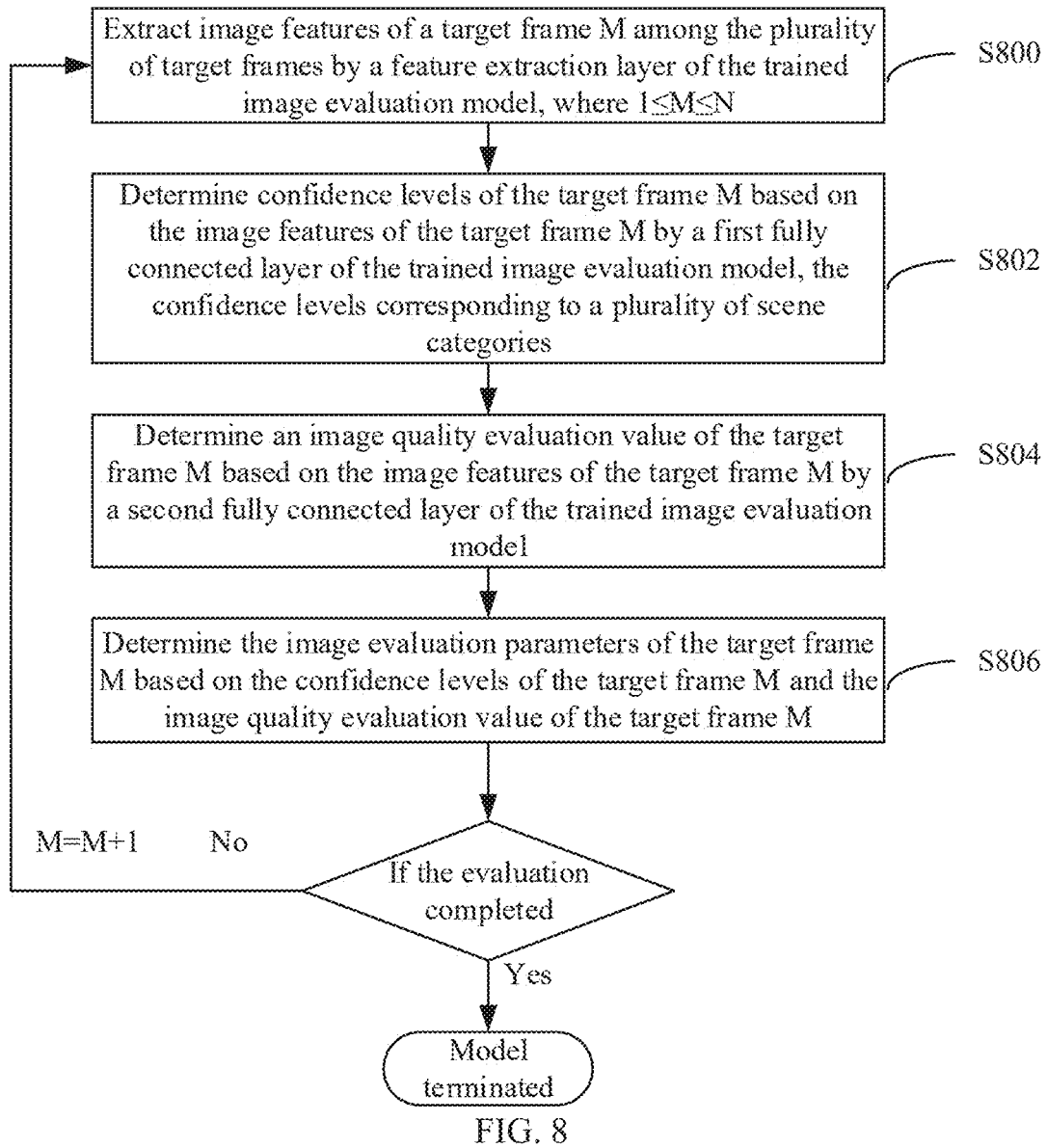
FIG. 8 schematically shows a sub-flow chart of an image evaluation operation.

As shown in FIG. 8, the step S206B may include steps S800-S806. Step S800 extracts the image features of the target frame M through the feature extraction layer in the image evaluation model, where 1≤M≤N and N is the count of the plurality of target frames; Step S802 obtains the confidence level of the target frame M corresponding to each scene category based on the image features of the target frame M and the first fully connected layer in the image evaluation model, obtain the confidence level of the target frame M corresponding to each scene category; Step S804 obtains the image quality value of the target frame M based on the image features of the target frame M and the second fully connected layer in the image evaluation model; Step S806 obtains the image evaluation parameters of the target frame M based on the confidence level of the target frame M corresponding to each scene category and the image quality value of the target frame M; and steps S800 to S806 are repeatedly performed until all the evaluations of the plurality of target frames are completed.

In the exemplary embodiment, the scene categories may be as follows: "ACG (Animation Comic Game)", "ACG_Object (Animation Comic Object)", "Animal", "Food", "Game", "Multi-Person", "Object", "Person", "Scenery", "Text", "Other". The image quality value ranges from 0 to 1, which is relevant to luminance, chrominance, and the like. If the image quality value of a target frame is more closer to 1, it means that the image quality of the target frame is higher.

In the exemplary embodiment, the image evaluation parameters of the target frame M are obtained by the following formula:

$$P = p2 \Sigma_i W_{i, arg\ max\ p1} p1_i$$

where $p1_i$ denotes a confidence of a target frame M corresponding to an ith scene category, p2 denotes an image quality value of the target frame M, arg max p1 denotes a target scene category with a highest confidence, and $W_{i, arg\ max\ p1}$ denotes a degree of association weight between the target scene category corresponding to the target frame M and the ith scene category. arg max p1 denotes the target scene category with the highest confidence. When the scene category of a target frame Z obtained through the first fully connected layer is "Person (single person)", the following needs to be considered: In the case where the scene category of the target frame Z is recognized as "Person (single person)", the actual category may be "Multi-Person (a plurality of persons)", and even may be "Scenery (landscape)". To address such problem and inferred from $\Sigma_i W_{i, arg\ max\ p1} p1_i$ this embodiment will provide a plurality of prior weight values (that is, the weight of the degree of association), such as: (1) the prior weight value in the case where the scene category of the target frame Z is "Person" (single person) when the scene category of the target frame Z is "Person" (single person) (that is, $W_{i, arg\ max\ p1}$ corresponding to i=arg max p1)"; (2) the prior weight value in the case where the scene category of the target frame Z is "Multi-Person" (a plurality of persons) when the scene category of the target frame Z is "Person" (single person) (that is, the weight of degree of association between "Person (single person) and "Multi-Person" (a plurality of persons)); (3) the prior weight value in the case where the scene category of the target frame Z is "ACG" when the scene category of the target frame Z is "Person" (single person) (that is, the weight of degree of association between "Person (single person) and "ACG"); (4) the prior weight value in the case where the scene category of the target frame Z is "ACG_Object" when the scene category of the target frame Z is "Person" (single person) (that is, the weight of degree of association between "Person (single person) and "ACG_Object"); . . . $\Sigma_i W_{i, arg\ max\ p1} p1_i$ can effectively suppress the large-scale evaluation error caused by the scene classification error.

Step S206C. Obtain the image evaluation parameters of each of the plurality of target frames from the image evaluation thread by the main thread, select one or more candidate frames from the plurality of target frames based on the image evaluation parameters of each of the plurality of target frames, and generate the video cover based on the one or more candidate frames.

The image evaluation thread transmits the image evaluation parameters (eg, scores) of each target frame obtained by the image evaluation model to the main thread. After the main thread obtains the image evaluation parameters of each target frame, it can rank the plurality of target frames according to the image evaluation parameters of each target frame, and sets some target frames with top ranks as candidate frames. The candidate frames are displayed in the target page in a certain order, as shown in FIG. 3.

Figure 9:
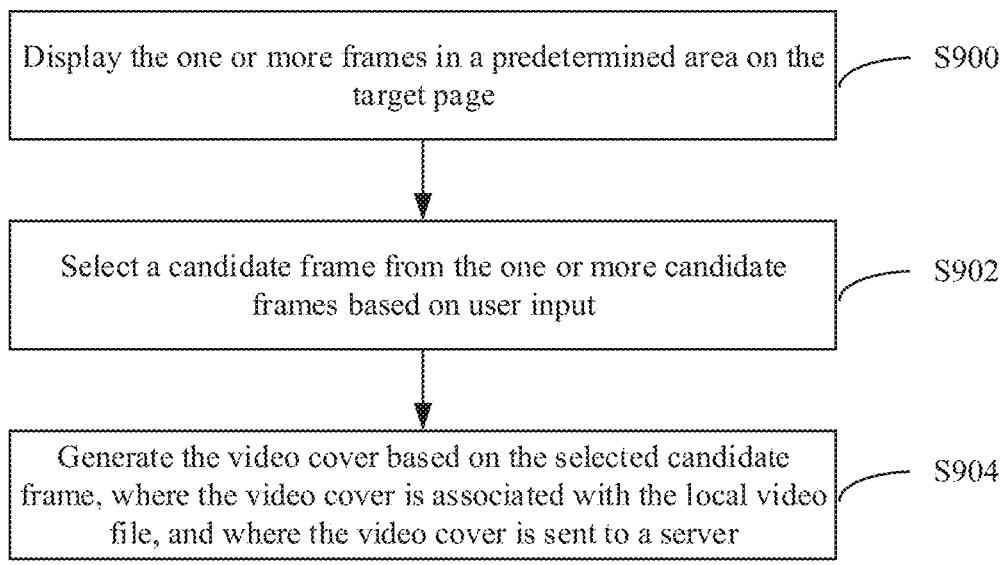
FIG. 9 schematically shows a sub-flow chart of a video cover generation operation in the main thread.

In the exemplary embodiment, as shown in FIG. 9, the generation of a cover for the video based on the one or more candidate frames may include steps S900 to S904. Step S900 displays the one or more candidate frames on the predetermined area of the target page; Step S902 selects one candidate frame from the one or more candidate frames according to user instruction; Step S902 generates a cover for the video based on the selected candidate frame and such cover is associated with the local video file and provided to the server (eg, content publisher 3).

Figure 10:
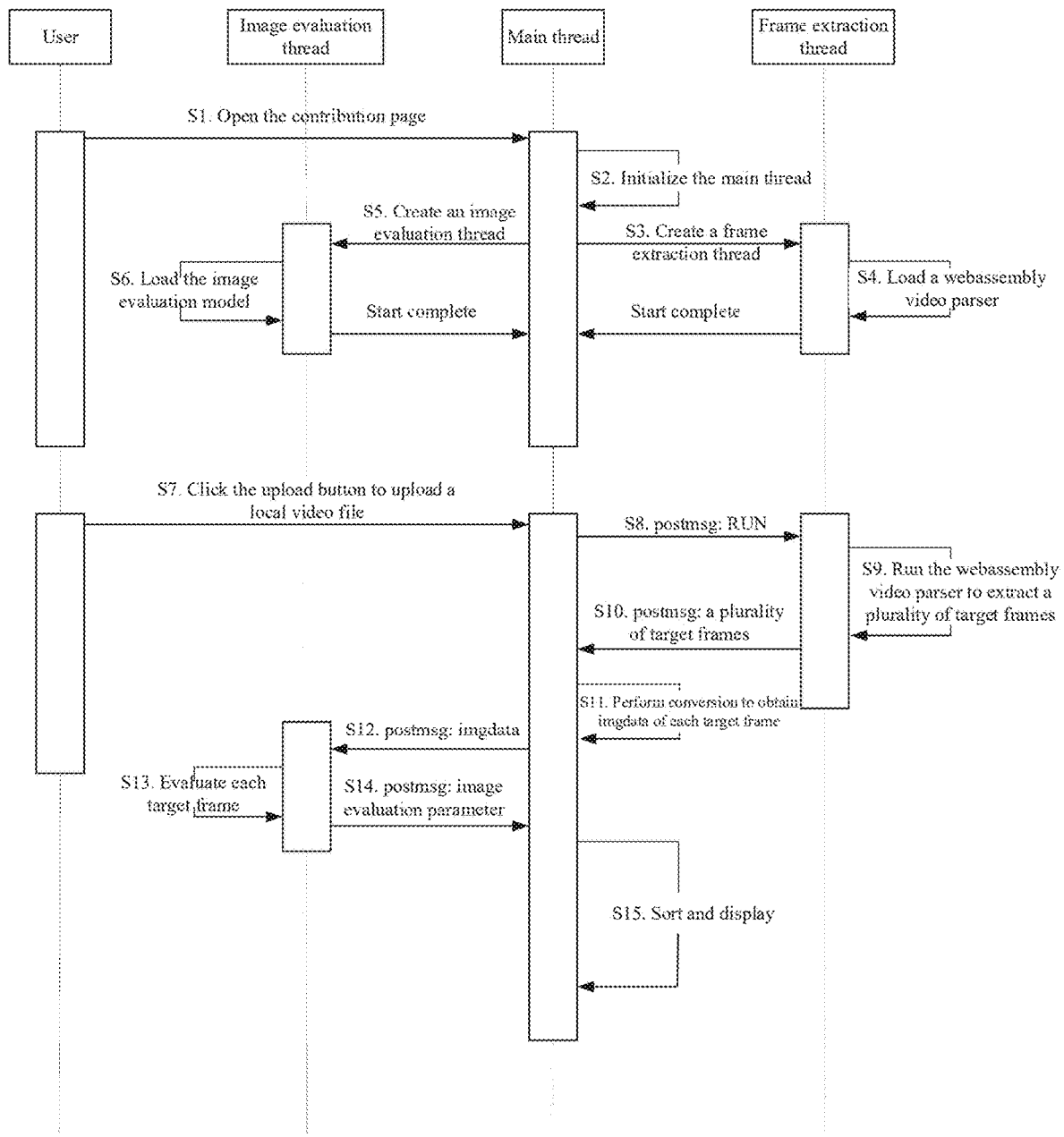
FIG. 10 schematically shows an exemplary flow chart for generating a video cover.

In order to make this application clearer and easier to understand, an exemplary process for generating a cover for the video is provided below. As shown in FIG. 10:

S1: Open the submission page according to the user's instruction.
S2: Initialize the main thread.
S3: Create a frame extraction thread.
S4: Load the webassembly video parser in the frame extraction thread.
S5: Create an image evaluation thread.
S6: Load the image evaluation model (such as tensorflow.js) in the image evaluation thread.
S7: The user clicks the upload button to upload a local video file.
S8: The main thread notifies the frame extraction thread to start running (postmsg:RUN).
S9: Run the webassembly video parser to extract a plurality of target frames.
S10: The frame extraction thread transmits the plurality of target frames to the main thread (postmsg: a plurality of target frames).
S11: Convert and obtain imgdata of each target frame. The main thread converts the image data format of each target frame into a data format that can be recognized by the image evaluation model. imgdata is image data in a data format that can be recognized by the image evaluation model. It should be noted that this step may also be performed in the image evaluation thread, which is not limited in this application.
S12: The main thread transfers imgdata to the image evaluation thread (postmsg:imgdata).
S13: The image evaluation thread evaluates each target frame through the image evaluation model. The image evaluation thread inputs the imgdata of each frame into the image evaluation model for the image evaluation model to obtain the image evaluation parameters of each target frame.
S14: The image evaluation thread transmits the image evaluation parameters of each target frame to the main thread (postmsg: image evaluation parameters).
S15: The main thread performs the following operations: ranking the plurality of target frames according to the image evaluation parameters of each target frame, selecting some target frames with top ranks as candidate frames, and displaying these candidate frames on the target page in a certain order for the user to select.

Exemplarily, if the user needs to publish a local video file to the bilibili platform, the user can open the bilibili submission page through a browser and click the upload button "Submit". After this upload button is triggered, the browser will perform the following operations in parallel: (1) uploading the local video file to the bilibili platform, (2) obtaining and displaying candidate frames for the video cover through local computing resources for the user to select.

The method for generating a video cover described in this embodiment has the following technical advantages:

(1) In this embodiment, three independent and mutually cooperative threads (ie, the main thread, the frame extraction thread, and the image evaluation thread) are provided under the target page, so that operations such as frame extraction and image evaluation do not need to be performed in the main thread, thus ensuring that the rendering, displaying, page interaction, etc. in the main thread are not affected by operations such as frame extraction and image evaluation which guarantees the fluency of the main thread.

(2) In this embodiment, the webassembly technology is adopted, and the webassembly video parser is loaded and run through the frame extraction thread. The browser can independently extract a plurality of target frames from the local video file without uploading the local video file to the server (such as the content publisher 3) and retrieving a plurality of target frames extracted by the server.

Based on the webassembly technology, this embodiment enables the browser to independently complete operations such as frame extraction for videos in various encoding formats, thereby reducing the load on the server. For example, the browser in this embodiment may support at least the following video encoding formats: MPEG (Moving Picture Experts Group) series, WMV (Windows Media Video) series, FLV (flash video), msvideo1 (Microsoft Video 1, an AVI codec provided by Microsoft), mss2, H264 (that is, a new generation of digital video compression format following MPEG4 jointly proposed by the International Organization for Standardization and the International Telecommunication Union), HEVC (High Efficiency Video Coding), H263 (ie, the low-bit-rate video coding standard for video conferences formulated by ITU-T), RV40 (RealVideo 9, a coding format based on H.264 draft), RV20 (RealVideo) G2 or RealVideo G2+SVT), dvvideo (Digital Video Format, digital video coding), rawvideo (video format without any post-processing or modification), v210 (ie, a UYVY format), TSCC series (TechSmith Screen Capture Codec, a video codec developed by Techsmith), prores (that is, a destructive compression film compression technology developed by Apple), vp6f, PNG (Portable Network Graphics), MJPEG (Motion Joint Photographic Experts Group), GIF (Graphics Interchange Format), VP series (ie, an open format, a video compression standard developed by Google without licensing fees), theora (ie, a lossy image compression technique in a format developed by the Xiph.Org Foundation).

(3) In this embodiment, by loading and running the image evaluation model through the image-evaluating thread, the browser can independently perform the image evaluation operation without uploading the local video file to the server (such as the content publisher 3) and evaluate and return image evaluation parameters by the server.

That is to say, in this embodiment, the tensorflow-javascript technology is adopted to package the image evaluation model originally running on the server into a format that can be run in the browser and distribute it to the browser, so that the browser can run the image evaluation model locally and perform the image evaluation of the target frames, thereby avoiding the server waiting time caused by the use of the server to perform the image evaluation.

(4) In the prior art, the following steps are required for cover generation: the user uploads the video file through the browser→the video file is completely uploaded to the server→the server performs frame extraction on the video file→the server performs image evaluation for each frame-→the server selects some frames to feed back to the browser for the user to select for the cover of the video.

This embodiment reduces the above complicated steps. In this embodiment, the browser can independently complete a series of operations such as frame extraction and image evaluation, which avoids the problem of long cover generation time caused by the need of the server in the prior art and also avoids the problem of serious consumption of server resources.

(5) In the prior art, the server has to perform operations such as frame extraction and image evaluation after the local video file is fully uploaded. Therefore, when the local video is large or the network connection is not good, the time required to generate the cover by the prior art will be very long.

In this embodiment, the browser can independently complete operations such as frame extraction, image evaluation, and cover generation. When a user uploads a local video file through a browser, the browser can perform the process of uploading the local video file and the process of generating the cover for the local video file simultaneously, which greatly shortens the time required for generating the cover. Generally, the processing time for the cover generation of the local video file is shorter than that for the uploading of the local video file.

(6) Tests show that: by using the method for generating a video cover of this embodiment, both the cover presentation rate and the completion rate are improved, and the cover generation time is significantly reduced.

Cover presentation rate: when a user submits a video, the comprehensive presentation rate of the recommended cover has increased from about 60% to more than 75%;

Completion rate: About 50% of submitting users can complete the generation of the video cover before the submissions are done;

Running time: After testing a large number of samples, in about 50% of the tests, covers can be generated within 10 seconds, in about 80% of the tests, covers can be generated within 20 seconds, and in about 98% of the tests, covers can be generated within 30 seconds. While, the running time by the prior art depends on a plurality of factors, such as the video file size, network transmission speed, server workload, etc., which lead to a long and unstable processing time.

Embodiment 2

Figure 11:
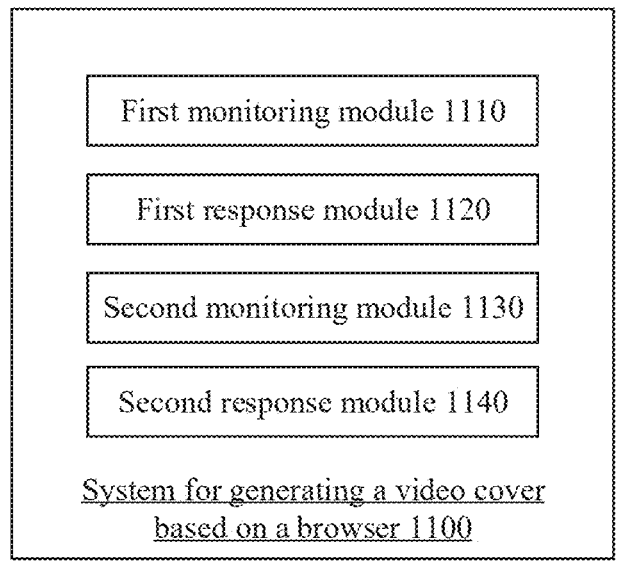
FIG. 11 schematically shows a block diagram of a system for generating a video cover based on a browser according to a second embodiment of this application.

FIG. 11 schematically shows a block diagram of an a system for generating a video cover based on a browser for this application according to Embodiment 2. The system for generating a video cover based on a browser may be divided into one or more program modules, and one or more program modules are stored in a storage medium and executed by one or more processors to complete this embodiment of this application. The program modules referred to in this embodiment of this application refer to a series of computer-readable instruction segments capable of performing specific functions. The following description will specifically describe the functions of each program module in this embodiment.

As shown in FIG. 11, the system 1100 for generating a video cover based on a browser may include a first monitoring module 1110, a first response module 1120, a second monitoring module 1130 and a second response module 1140.

The first monitoring module 1110 is used to monitor whether the browser enters a target page; The first response module 1120 is configured to initialize a main thread and create a frame extraction thread and an image evaluation thread in response to determining that the browser enters the target page, where the frame extraction thread is configured to load a webassembly video parser, and where the image evaluation thread is configured to load a trained image evaluation model;

The second monitoring module 1130 is configured to monitor a target action on the target page, where the target action is associated with a local video file; and The second response module 1140 is configured to perform the following operations in response to the target action: extracting a plurality of target frames from the local video file using the webassembly video parser, where the webassembly is running by frame extraction thread; determining image evaluation parameters of each of the plurality of target frame using the trained image evaluation model, where the trained image evaluation model is running by the image evaluation thread; and obtaining the image evaluation parameters of each of the plurality of target frames from the image evaluation thread by the main thread, selecting one or more candidate frames from the plurality of target frames based on the image evaluation parameters of each of the plurality of target frames, and generating the video cover based on the one or more candidate frames.

In the exemplary embodiment, the second response module 1140 is also used to: determine whether the local video file is in a portrait orientation using the WebAssembly video parser; extract a plurality of frames from the local video file using the WebAssembly video parser; perform image rotation on each of the plurality of frames to obtain frames in the portrait orientation if the local video file is in the portrait orientation; and determine the plurality of frames in the portrait orientation as the plurality of target frames.

In the exemplary embodiment, the second response module 1140 is further used to: obtain N frames corresponding to N time nodes, including: acquiring a key frame closest to a time node M, and determining the key frame as a frame corresponding to the time node M, where 1≤M≤N.

In the exemplary embodiment, the second response module 1140 is further used to: perform a detection operation on the local video file, and determine whether to extract a plurality of target frames from the local video file; where, the detection operation is used to detect: whether the local video file is a corrupted file, whether the local video file contains a video stream, and/or a video format of the video stream is supported by the webassembly video parser. In the exemplary embodiment, the second response module 1140 is further used to: extract image features of a target frame M among the plurality of target frames by a feature extraction layer of the trained image evaluation model, where 1≤M≤N, and N represents a total number of the plurality of target frames; determine confidence levels of the target frame M based on the image features of the target frame M by a first fully connected layer of the trained image evaluation model, the confidence levels corresponding to a plurality of scene categories; determine an image quality evaluation value of the target frame M based on the image features of the target frame M by a second fully connected layer of the trained image evaluation model; and determine the image evaluation parameters of the target frame M based on the confidence levels of the target frame M and the image quality evaluation value of the target frame M.

In the exemplary embodiment, the second response module 1140 is further used to: determine the image evaluation parameters P of the target frame M by a formula:

$$P = p2 \Sigma_i W_{i, arg\,max\,p1} p1_i$$

where $p1_i$ represents a confidence level of the target frame M corresponding to a scene category i, p2 represents the image quality evaluation value of the target frame M, arg max p1 represents a target scene category with a maximum confidence level, and $W_{i, arg\,max\,p1}$ represents a weight of a degree of association between the target scene category corresponding to the target frame M and an ith scene category.

In the exemplary embodiment, the second response module 1140 is further used to: display the one or more candidate frames in a predetermined area of the target page; select a candidate frame from the one or more candidate frames based on user input; and generate the video cover based on the selected candidate frame, where the video cover is associated with the local video file, and where the video cover is sent to a server.

Embodiment 3

Figure 12:
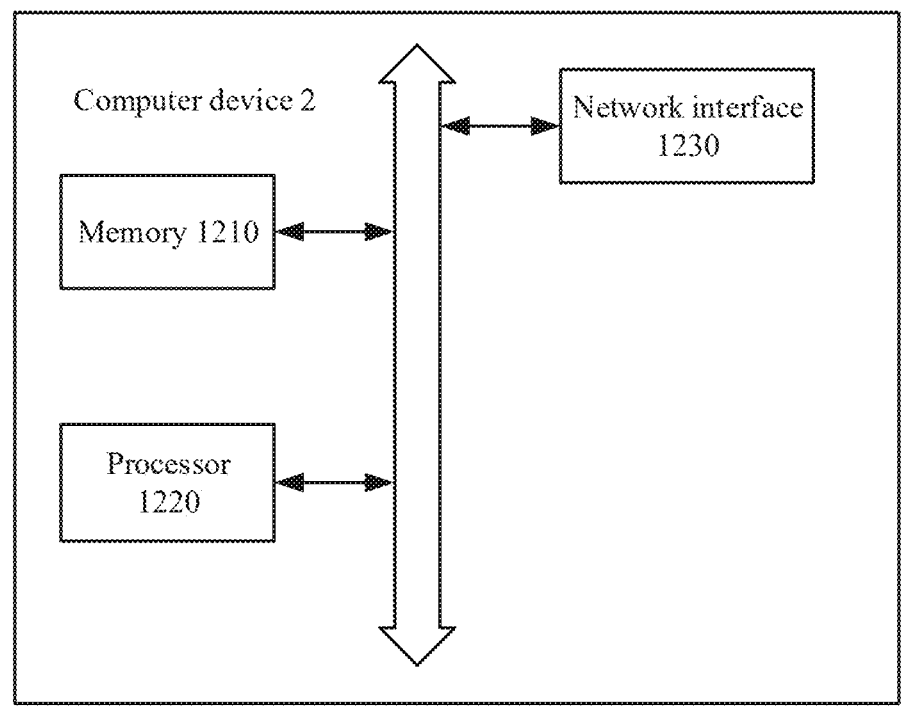
FIG. 12 schematically shows a schematic diagram of a hardware architecture of a computing device suitable for implementing the method for generating a video cover based on a browser according to a third embodiment of this application.

FIG. 12 schematically shows a schematic diagram of a hardware architecture of a computing device 2 suitable for implementing a method for generating a video cover based on a browser for this application according to Embodiment 3. In this embodiment, the computing device 2 is a device that can automatically perform numerical calculation and/or information processing according to pre-set or stored instructions. For example, it can be terminal devices such as smart phones, tablet computers, notebook computers, and desktop computers. As shown in FIG. 12, the computing device 2 at least consists of but is not limited to: a memory 1210, a processor 1220, and a network interface 1230 that can communicate with each other through a system bus.

The memory 1210 consists of at least one type of computer-readable storage medium, and the readable storage medium may be flash memory, hard disk, multimedia card, card-type memory (eg, SD or DX memory, etc.), random access memory (RAM), static random access memory (SRAM), read only memory (ROM), electrically erasable programmable read only memory (EEPROM), programmable read only memory (PROM), magnetic memory, magnetic disk, optical disk, etc. In some embodiments, the memory 1210 may be an internal storage module of the computing device 2, such as a hard disk or memory of the computing device 2. In other embodiments, the memory 1210 may also be an external storage device of the computing device 2, such as a pluggable hard disk, a Smart Media Card (SMC), a Secure Digital card (SD), flash memory card (Flash Card) and others equipped on the computing device 2. Of course, the memory 1210 may also include both the internal storage module of the computing device 2 and its external storage device. In this embodiment, the memory 1210 is generally used to store the operating system and various application software installed in the computing device 2, such as program codes of a method for generating a cover based on a browser, and the like. In addition, the memory 1210 may also be used to temporarily store various types of data that have been output or will be output.

In some embodiments, the processor 1220 may be a central processing unit (CPU), a controller, a microcontroller, a microprocessor, or other data processing chips. The processor 1220 is generally used to control the overall operation of the computing device 2, such as performing control and processing related to data interaction or communication with the computing device 2. In this embodiment, the processor 1220 is configured to run program codes or process data stored in the memory 1210.

The network interface 1230 may be composed of a wireless network interface or a wired network interface, it is typically used to establish a communication link between the computing device 2 and other computing devices. For example, the network interface 1230 is used to connect the computing device 2 with an external terminal through a network, and establish a data transmission channel and a communication link between the computing device 2 and the external terminal. The network can be intranet, Internet, Global System of Mobile communication (GSM), Wideband Code Division Multiple Access (WCDMA), 4G network, 5G network, Bluetooth (Bluetooth), Wi-Fi and other wireless or wired networks.

It should be noted that FIG. 12 only shows a computing device composed of components 1210-1230, but it should be understood that not all shown components are required, and more or fewer components may be implemented alternatively.

In this embodiment, the method for generating a video cover based on a browser stored in the memory 1210 may also be divided into one or more program modules and executed by one or more processors (the processor 1220 in this embodiment), to complete the embodiments of this application.

Embodiment 4

This application also provides a computer-readable storage medium, where computer-readable instructions are stored on the computer-readable storage medium, and when the computer-readable instructions are executed by a processor, the following steps are performed: monitor whether the browser enters a target page;
initialize a main thread and create a frame extraction thread and an image evaluation thread in response to determining that the browser enters the target page, where the frame extraction thread is configured to load a webassembly video parser, and where the image evaluation thread is configured to load a trained image evaluation model;
monitor a target action on the target page, where the target action is associated with a local video file; and perform following operations in response to the target action: extracting a plurality of target frames from the local video file using the webassembly video parser, where the webassembly is running by frame extraction thread;
determining image evaluation parameters of each of the plurality of target frame using the trained image evaluation model, where the trained image evaluation model is running by the image evaluation thread; and
obtaining the image evaluation parameters of each of the plurality of target frames from the image evaluation thread by the main thread, selecting one or more candidate frames from the plurality of target frames based on the image evaluation parameters of each of the plurality of target frames, and generating the video cover based on the one or more candidate frames.

In this embodiment, the computer-readable storage medium may be flash memory, hard disk, multimedia card, card-type memory (for example, SD or DX memory, etc.), random access memory (RAM), static random access memory (SRAM), read-only memory (ROM), Electrically Erasable Programmable Read-Only Memory (EEPROM), Programmable Read-Only Memory (PROM), Magnetic Memory, Magnetic Disk, Optical Disk, etc. In some embodiments, the computer-readable storage medium may be an internal storage unit of a computing device, such as a hard disk or a memory of the computing device. In other embodiments, the computer-readable storage medium may also be an external storage device of a computing device, such as a pluggable hard disk, a Smart Media Card (SMC), a secure digital (SD) card, flash memory card (Flash Card) and so on. Of course, the computer-readable storage medium may also include both the internal storage unit of the computing device and the external storage device thereof. In this embodiment, the computer-readable storage medium is generally used to store the operating system and various application software installed on the computing device, for example, the program code of the method for generating a video cover based on a browser in the embodiment. In addition, the computer-readable storage medium can also be used to temporarily store various types of data that have been output or will be output.

Obviously, those skilled in the art should understand that each module or each step of the above-mentioned embodiments of this application may be implemented by a general-purpose computing device, and they may be centralized on a single computing device, or distributed in a network composed of a plurality of computing devices. Optionally, they can be implemented with program code executable by a computing device, so that they can be stored in a storage device and executed by the computing device, and in some cases, can be implemented in a different sequence from the illustrated or described steps herein, or by fabricating them separately into individual integrated circuit modules, or by fabricating a plurality of modules or steps of them into a single integrated circuit module. As such, the embodiments of this application are not limited to any specific combination of hardware and software.

The above are only the preferred embodiments of this application, and are not intended to limit the scope of the patent of this application. Any equivalent structure or equivalent process transformation made by using the contents of the description and drawings of this application, or directly or indirectly applied in other related technical fields, are similarly included within the scope of patent protection of this application.

What is claimed is:

1. A method for generating a video cover based on a browser executed by a computing device, comprising:
monitoring whether the browser enters a target page;
initializing a main thread and creating a frame extraction thread and an image evaluation thread in response to determining that the browser enters the target page, wherein the frame extraction thread is configured to load a webassembly video parser in the browser to provide browser-based frame extraction, wherein the image evaluation thread is configured to load a trained image evaluation model, and wherein the trained image evaluation model comprises a trained neural network;
monitoring a target action on the target page, wherein the target action is associated with a local video file;
in response to the target action, performing operations comprising:
extracting a plurality of target frames from the local video file using the webassembly video parser, wherein the webassembly is running by frame extraction thread;
determining image evaluation parameters of each of the plurality of target frame using the trained image evaluation model, wherein the trained image evaluation model is running by the image evaluation thread;
obtaining the image evaluation parameters of each of the plurality of target frames from the image evaluation thread by the main thread;
selecting one or more candidate frames from the plurality of target frames based on the image evaluation parameters of each of the plurality of target frames; and
generating the video cover based on the one or more candidate frames.

2. The method of claim 1, wherein the extracting a plurality of target frames from the local video file using the webassembly video parser further comprises:
determining whether the local video file is in a portrait orientation using the webassembly video parser;

extracting a plurality of frames from the local video file using the webassembly video parser;

performing image rotation on each of the plurality of frames to obtain frames in the portrait orientation in response to determining that the local video file is in the portrait orientation; and determining the plurality of frames in the portrait orientation as the plurality of target frames.

3. The method of claim 1, wherein the extracting a plurality of target frames from the local video file using the webassembly video parser further comprises:

obtaining N frames corresponding to N time nodes, wherein the obtaining N frames corresponding to N time nodes further comprises:

acquiring a key frame closest to a time node M, and determining the key frame as a frame corresponding to the time node M, wherein $1 \leq M \leq N$.

4. The method of claim 1, wherein the extracting a plurality of target frames from the local video file using the webassembly video parser further comprises:

performing a detection operation on the local video file; and determining whether to extract the plurality of target frames from the local video file based on a detection result, wherein the detection operation is configured to detect whether the local video file is a damaged file, whether the local video file contains a video stream, and whether a video format of the video stream is supported by the webassembly video parser.

5. The method of claim 1, wherein the determining image evaluation parameters of each of the plurality of target frame using the trained image evaluation model further comprises:

extracting image features of a target frame M among the plurality of target frames by a feature extraction layer of the trained image evaluation model, wherein $1 \leq M \leq N$ and N represents a total number of the plurality of target frames;

determining confidence levels of the target frame M based on the image features of the target frame M by a first fully connected layer of the trained image evaluation model, the confidence levels corresponding to a plurality of scene categories;

determining an image quality evaluation value of the target frame M based on the image features of the target frame M by a second fully connected layer of the trained image evaluation model; and determining the image evaluation parameters of the target frame M based on the confidence levels of the target frame M and the image quality evaluation value of the target frame M.

6. The method of claim 5, wherein the determining the image evaluation parameters of the target frame M based on the confidence levels of the target frame M and the image quality evaluation value of the target frame M further comprises:

determining the image evaluation parameters P of the target frame M based on a formula:

$$P = p2 \Sigma_i W_{i, arg\ max\ p1} p1_i$$

wherein $p1_i$ represents a confidence level of the target frame M corresponding to a scene category I, p2 represents the image quality evaluation value of the target frame M, arg max p1 represents a target scene category with a maximum confidence level, and Wi,arg max p1 represents a weight of a degree of association between the target scene category corresponding to target frame M and an ith scene category.

7. The method of claim 1, wherein the generating the video cover based on the one or more candidate frames further comprises:

displaying the one or more candidate frames in a predetermined area of the target page;

selecting a candidate frame from the one or more candidate frames based on user input; and generating the video cover based on the selected candidate frame, wherein the video cover is associated with the local video file, and wherein the video cover is sent to a server.

8. A computing device, comprising a memory, a processor, and computer-readable instructions stored in the memory and executable by the processor, wherein the processor executes the computer-readable instructions to perform operations comprising:

monitoring whether the browser enters a target page;

initializing a main thread and creating a frame extraction thread and an image evaluation thread in response to determining that the browser enters the target page, wherein the frame extraction thread is configured to load a webassembly video parser in the browser to provide browser-based frame extraction, wherein the image evaluation thread is configured to load a trained image evaluation model, and wherein the trained image evaluation model comprising a trained neural network;

monitoring a target action on the target page, wherein the target action is associated with a local video file;

in response to the target action, performing operations comprising:

extracting a plurality of target frames from the local video file using the webassembly video parser, wherein the webassembly is running by frame extraction thread;

determining image evaluation parameters of each of the plurality of target frame using the trained image evaluation model, wherein the trained image evaluation model is running by the image evaluation thread;

obtaining the image evaluation parameters of each of the plurality of target frames from the image evaluation thread by the main thread;

selecting one or more candidate frames from the plurality of target frames based on the image evaluation parameters of each of the plurality of target frames; and generating the video cover based on the one or more candidate frames.

9. The computing device of claim 8, wherein the extracting a plurality of target frames from the local video file using the webassembly video parser further comprises:

determining whether the local video file is in a portrait orientation using the webassembly video parser;

extracting a plurality of frames from the local video file using the webassembly video parser;

performing image rotation on each of the plurality of frames to obtain frames in the portrait orientation in response to determining that the local video file is in the portrait orientation; and determining the plurality of frames in the portrait orientation as the plurality of target frames.

10. The computing device of claim 8, wherein the extracting a plurality of target frames from the local video file using the webassembly video parser further comprises:

obtaining N frames corresponding to N time nodes, wherein the obtaining N frames corresponding to N time nodes further comprises:

acquiring a key frame closest to a time node M, and determining the key frame as a frame corresponding to the time node M, wherein $1 \leq M \leq N$.

11. The computing device of claim 8, wherein the extracting a plurality of target frames from the local video file using the webassembly video parser further comprises:
   performing a detection operation on the local video file; and
   determining whether to extract the plurality of target frames from the local video file based on a detection result, wherein the detection operation is configured to detect whether the local video file is a damaged file, whether the local video file contains a video stream, and whether a video format of the video stream is supported by the webassembly video parser.

12. The computing device of claim 8, wherein the determining image evaluation parameters of each of the plurality of target frame using the trained image evaluation model further comprises:
   extracting image features of a target frame M among the plurality of target frames by a feature extraction layer of the trained image evaluation model, wherein 1≤M≤N, and N represents a total number of the plurality of target frames;
   determining confidence levels of the target frame M based on the image features of the target frame M by a first fully connected layer of the trained image evaluation model, the confidence levels corresponding to a plurality of scene categories;
   determining an image quality evaluation value of the target frame M based on the image features of the target frame M by a second fully connected layer of the trained image evaluation model; and
   determining the image evaluation parameters of the target frame M based on the confidence levels of the target frame M and the image quality evaluation value of the target frame M.

13. The computing device of claim 12, wherein the determining the image evaluation parameters of the target frame M based on the confidence levels of the target frame M and the image quality evaluation value of the target frame M further comprises:
   determining the image evaluation parameters P of the target frame M based on a formula:

$P = p2 \Sigma_i W_{i, arg\, max\, p1} p1_i$ wherein $p1_i$ represents a confidence level of the target frame M corresponding to a scene category I, p2 represents the image quality evaluation value of the target frame M, arg max p1 represents a target scene category with a maximum confidence level, and Wi,arg max p1 represents a weight of a degree of association between the target scene category corresponding to target frame M and an ith scene category.

14. The computing device of claim 8, wherein the generating the video cover based on the one or more candidate frames further comprises:
   displaying the one or more candidate frames in a predetermined area of the target page;
   selecting a candidate frame from the one or more candidate frames based on user input; and
   generating the video cover based on the selected candidate frame, wherein the video cover is associated with the local video file, and wherein the video cover is sent to a server.

15. A non-transitory computer-readable storage medium having computer-readable instructions stored therein, the computer-readable instructions being executable by at least one processor to cause the at least one processor to perform operations comprising:
   monitoring whether the browser enters a target page;
   initializing a main thread and creating a frame extraction thread and an image evaluation thread in response to determining that the browser enters the target page, wherein the frame extraction thread is configured to load a webassembly video parser in the browser to provide browser-based frame extraction, wherein the image evaluation thread is configured to load a trained image evaluation model, and wherein the trained image evaluation model comprising a trained neural network;
   monitoring a target action on the target page, wherein the target action is associated with a local video file;
   in response to the target action, performing operations comprising:
   extracting a plurality of target frames from the local video file using the webassembly video parser, wherein the webassembly is running by frame extraction thread;
   determining image evaluation parameters of each of the plurality of target frame using the trained image evaluation model, wherein the trained image evaluation model is running by the image evaluation thread;
   obtaining the image evaluation parameters of each of the plurality of target frames from the image evaluation thread by the main thread;
   selecting one or more candidate frames from the plurality of target frames based on the image evaluation parameters of each of the plurality of target frames; and
   generating the video cover based on the one or more candidate frames.

16. The non-transitory computer-readable storage medium of claim 15, wherein the extracting a plurality of target frames from the local video file using the webassembly video parser further comprises:
   determining whether the local video file is in a portrait orientation using the webassembly video parser;
   extracting a plurality of frames from the local video file using the webassembly video parser;
   performing image rotation on each of the plurality of frames to obtain frames in the portrait orientation in response to determining that the local video file is in the portrait orientation; and
   determining the plurality of frames in the portrait orientation as the plurality of target frames.

17. The non-transitory computer-readable storage medium of claim 15, wherein the extracting a plurality of target frames from the local video file using the webassembly video parser further comprises:
   obtaining N frames corresponding to N time nodes, wherein the obtaining N frames corresponding to N time nodes further comprises:
   acquiring a key frame closest to a time node M, and determining the key frame as a frame corresponding to the time node M, wherein 1≤M≤N.

18. The non-transitory computer-readable storage medium of claim 15, wherein the extracting a plurality of target frames from the local video file using the webassembly video parser further comprises:
   performing a detection operation on the local video file; and
   determining whether to extract the plurality of target frames from the local video file based on a detection result, wherein the detection operation is configured to detect whether the local video file is a damaged file, whether the local video file contains a video stream, and whether a video format of the video stream is supported by the webassembly video parser.

19. The non-transitory computer-readable storage medium of claim 15, wherein the determining image evaluation parameters of each of the plurality of target frame using the trained image evaluation model further comprises:
- extracting image features of a target frame M among the plurality of target frames by a feature extraction layer of the trained image evaluation model, wherein $1 \leq M \leq N$, and N represents a total number of the plurality of target frames;
- determining confidence levels of the target frame M based on the image features of the target frame M by a first fully connected layer of the trained image evaluation model, the confidence levels corresponding to a plurality of scene categories;
- determining an image quality evaluation value of the target frame M based on the image features of the target frame M by a second fully connected layer of the trained image evaluation model; and
- determining the image evaluation parameters of the target frame M based on the confidence levels of the target frame M and the image quality evaluation value of the target frame M.

\* \* \* \* \*